United States Patent [19]

Rustamov et al.

[11] 4,146,462
[45] Mar. 27, 1979

[54] HYDROISOMERIZATION OF GASOLINE FRACTION

[76] Inventors: Musa I. O. Rustamov, ulitsa Gadzhibekova, 16, kv. 3; Vagab S. Aliev, ulitsa Nizami, 66, kv. 40; Khagigat I. K. Abad-Zade, Verkhnyaya Nagornaya ulitsa, 7 tupik, 9; Azada D. Guseinova, ulitsa Aga-Neimatulla, 54, kv. 41, all of, Baku, U.S.S.R.

[21] Appl. No.: 907,572

[22] Filed: May 19, 1978

[51] Int. Cl.² ............ C10G 23/00; C07C 5/30
[52] U.S. Cl. .................... 208/46; 260/683.65
[58] Field of Search ........... 260/683.65; 208/137, 208/46

[56] References Cited

U.S. PATENT DOCUMENTS

| Re. 26,188 | 4/1967 | Kimberlin, Jr. et al. | 260/683.65 |
|---|---|---|---|
| 3,114,695 | 12/1963 | Rabo et al. | 260/683.65 |
| 3,173,855 | 3/1965 | Miale et al. | 260/683.65 |
| 3,190,939 | 6/1965 | Benesi | 260/683.65 |
| 3,280,212 | 10/1966 | Miale et al. | 260/683.65 |
| 3,370,099 | 2/1968 | Plank et al. | 260/683.65 |
| 3,687,839 | 8/1972 | Jenkins | 260/683.65 |
| 3,766,056 | 10/1973 | Young | 260/683.65 |

Primary Examiner—George Crasanakis
Attorney, Agent, or Firm—Haseltine, Lake & Waters

[57] ABSTRACT

A method for producing fractions of paraffin hydrocarbons of the $C_4$-$C_7$ isostructure, residing in hydroisomerization of a gasoline fraction in the presence of hydrogen on a catalyst at a temperature of 320°–400° C., under a pressure of 20 to 60 atm., a space rate of feeding the gasoline fraction of 1.0–1.5 hour$^{-1}$; used as a gasoline fraction being a straight run gasoline fraction boiling out within a temperature range of 85°–160° C. or 160°–195° C., or a gasoline fraction of the coking process, boiling out within a temperature range of 35°–85° C. or 43°–170° C.; the above catalyst comprising amorphous nickelalumosilicate and zeolite of the NaY type in the NiCaHY form, in a weight ratio of 60-90:40-10, respectively, the chemical composition of the catalyst being as follows (wt.%): Ni, 7-10; $Al_2O_3$, 5-6; $SiO_2$, 86-80; Ca, 1-2; H, 1-2. The target product obtained has a high octane number, up to 89–90 according to the motor method in a pure form. The method is carried out under relatively mild conditions. It allows utilization of available, easily accessible low-octane gasoline fractions.

1 Claim, No Drawings

HYDROISOMERIZATION OF GASOLINE FRACTION

FIELD OF APPLICATION

The present invention relates to the petroleum processing industry, and more particularly, to methods for producing fractions of paraffin hydrocarbons of the $C_4$-$C_7$ isostructure. Said fraction is used as an additive for improving the quality characteristics of automobile gasolines, including their octane number.

BACKGROUND OF THE INVENTION

Known in the art is a method for producing fractions of paraffin hydrocarbons of the isostructure, including $C_4$-$C_7$ fractions, by alkylating paraffin hydrocarbons with olefins of the isostructure in the presence of a catalyst such as concentrated sulphuric acid and hydrogen fluoride.

The alkylate comprising isoparaffin hydrocarbons has an octane number of 90-92 according to the motor method in a pure form. However, the catalyst used in the known method causes corrosion of the process equipment, and is toxic. In addition, the initial raw material resources are limited.

Known in the art is a method for producing fractions of paraffin hydrocarbons of the $C_4$-$C_7$ isostructure by means of hydroisomerization of a light straight run gasoline fraction, boiling out at a temperature to 62° C., on bifunctional catalysts constituted by noble metals, such as platinum and palladium, applied to aluminium oxide at a temperature of 400°-480° C.

Said method is characterized by high temperatures, which adversely affects the thermodynamic balance of the process and thereby makes it impossible to obtain a target product with a sufficiently high octane number (the octane number does not exceed 79-80 according to the motor method in a pure form). In addition, the insufficiently high conversion of the initial raw material into isoparaffins makes it necessary to recirculate the unconverted raw material, which complicates the flow sheet as a whole. Another disadvantage of the method lies in limited resources of the initial raw material.

The method described above can also be carried out in the presence of similar catalysts, but halogenated beforehand, which improves their activity and makes it possible to carry out the process at lower temperatures, namely, 100°-250° C.

This method makes it possible to obtain a fraction of paraffin hydrocarbons of the $C_4$-$C_7$ isostructure with a higher octane number (80-85, according to the motor method in a pure form). However, the catalysts used in this method are aggressive, cause intensive corrosion of the process equipment, and become rapidly deactivated.

Also known in the art is a method for producing fractions of paraffin hydrocarbons of the $C_4$-$C_7$ isostructure by hydroisomerization of the gasoline fraction of catalytic cracking, boiling out at 100° C., in the presence of hydrogen on a catalyst constituted by amorphous nickelalumosilicate, at a temperature of 200°-400° C., under a pressure of 40-120 atm. and at a space rate of feeding the gasoline fraction of 0.5-1.5 hour$^{-1}$.

The catalyst used in the above method does not make it possible to produce a target fraction with a sufficiently high octane number (the octane number does not exceed 83 according to the motor method in a pure form). In addition, the insufficiently high conversion of the initial raw material into isoparaffins makes it necessary to recirculate the unconverted raw material. Hydroisomerization at higher pressures (40-120 atm.) complicates the technology and equipment.

BRIEF DESCRIPTION OF THE INVENTION

It is an object of the present invention to provide a method which makes it possible to produce a fraction of paraffin hydrocarbons of the $C_4$-$C_7$ isostructure with a high octane number.

It is another object of the invention to provide a method which makes it possible to use low-octane gasoline fractions as the initial raw material.

It is a further object of the invention to provide a method which makes it possible to carry out hydroisomerization under milder conditions.

In accordance with the above and other objects, the invention resides in a method for producing fractions of paraffin hydrocarbons of the $C_4$-$C_7$ isostructure by hydroisomerization of a gasoline fraction in the presence of hydrogen on a catalyst comprising amorphous nickelalumosilicate, at a temperature of 320°-400° C., under an elevated pressure and a space rate of feeding the gasoline fraction of 1.0-1.5 hour$^{-1}$, so that, according to the invention, used as a gasoline fraction is a straight run gasoline fraction boiling out within a temperature range of 85°-160° C. or 160°-195° C., or a gasoline fraction of the coking process, boiling out within a temperature range of 35°-85° C. or 43°-170° C.; hydroisomerization is carried out under a pressure of 20-60 atm. on a catalyst comprising, together with amorphous nickelalumosilicate, zeolite of the NaY type in the NiCaHY form in a weight ratio of 60-90:40-10 respectively, the chemical composition of the catalyst being as follows (wt.,%): Ni, 7-10; $Al_2O_3$, 5-6; $SiO_2$, 86-80; Ca, 1-2; H, 1-2.

The catalyst used in the proposed method is highly active and makes it possible to obtain a target product with an octane number 87-90 according to the motor method in a pure form. The conditions for carrying out hydroisomerization are relatively mild (the pressure does not exceed 20-60 atm.), which considerably simplifies both the technology and the equipment. Said catalyst is prepared from available and easily accessible ingredients. It operates for a long time without regeneration (about 2,000 hours), and without losing its initial activity. The use of the catalyst of the above composition makes it possible to utilize various available low-octane gasoline fractions. It should be pointed out that such raw materials as the gasoline fraction of the coking process, boiling out within a temperature range of 35°-85° C. have never been used before.

DETAILED DESCRIPTION OF THE INVENTION

The herein-proposed method for producing a fraction of paraffin hydrocarbons of the $C_4$-$C_7$ isostructure is carried out according to a continuous flow sheet in the following manner.

Prior to feeding for hydroisomerization, the straight run gasoline fraction boiling out within a temperature range of 85°-160° C. or 160°-195° C., or a gasoline fraction of the coking process, boiling out within a temperature range of 35°-85° C. or 43°-170° C., are subjected to hydropurification by conventional methods (see, for example, N. B. Aspel, G. G. Demkina, Gidroochistka motornykh topliv /Hydropurification of Motor Fuels/, Leningrad, 1977). The hydrocarbon raw material is then mixed with hydrogen and passed through a catalyst bed in a hydroisomerization reactor, at a temperature of 320°–400° C. The catalyst comprises 60–90 weight percent of amorphous nickelalumosilicate and 40–10 weight percent of zeolite of the NaY type in the NiCaHY form, the chemical composition of the catalyst being as follows (wt. %): Ni, 7–10; $Al_2O_3$, 5–6; $SiO_2$, 86–80; Ca, 1–2; H, 1–2. Hydroisomerization is carried out at a temperature of 320°–400° C., under a pressure of 20–60 atm., the space rate of feeding the hydrocarbon raw material of 1.0–1.5 $hour^{-1}$, and the volumetric ratio of hydrogen to the raw material equal to 1,000–1,500:1, respectively. The hydroisomerizate representing a mixture of the reaction products with the unconverted raw material and excess hydrogen, is fed from the reactor to a condenser where condensation of the reaction products and the unconverted raw material takes place. The condensate in a mixture with gaseous reaction products and hydrogen is fed to a high-pressure separator where the condensate is separated from the gaseous reaction products and hydrogen. The condensate is fed to rectification for separating the target product, i.e. the fraction of paraffin hydrocarbons of the $C_4$–$C_7$ isostructure.

Hydroisomerization with preliminary hydropurification can be effected both in one reactor and in different consecutively arranged reactors. According to the first embodiment, the catalyst of hydropurification is placed in the top portion of the reactor, and the catalyst of hydroisomerization, in the bottom portion. Said embodiment makes it possible to regenerate both catalysts simultaneously.

The preparation of the catalyst, used in the herein-proposed method, comprises several stages.

1. Zeolite of the NaY type (the weight ratio of $SiO_2$: $Al_2O_3$ being equal to 4.8) is treated five times with a 4% aqueous solution of ammonium chloride. Each treatment is carried out at a temperature of 70°–80° C. and under continuous stirring for two hours. Said treatment results in a thorough exchange of sodium cations with ammonium cations. After filtration and washing of zeolite in the ammonium form, it is treated six times with a 4% aqueous solution of calcium chloride under the conditions described hereinabove. This treatment results in exchange of sodium and ammonium cations with calcium cations. Thereafter the zeolite in the ammonium-calcium form is washed with distilled water until the chlorine ions disappear, and dried at a temperature of 120°–200° C. for 2 to 3 hours.

The X-ray structural analysis shows that the crystalline structure of the zeolite after the cation exchange has not undergone any changes.

2. An aqueous solution of liquid glass with a specific gravity of 1.125 and content of $Na_2O$ of 3.5 weight percent is mixed with an aqueous solution of a mixture of nickel nitrate and aluminium sulphate acidulated with sulphuric acid (the weight ratio of salts being 1.5:1.0, respectively), at a temperature of 25° C. The volumetric ratio of the solution of liquid glass to that of salts is 5 to 1. As a result of mixing a gel is produced having a pH of 7.2–7.5.

3. The prepared zeolite in the ammonium-calcium form is mixed with a gel, and the mixture is subjected to heat treatment at a temperature of 35° C. for 4 hours. Said mixture is activated by treating it twice with an aqueous solution of nickel nitrate. Each treatment is carried out at 15° to 30° C. for 24 hours. The activation results in exchange of sodium cations with nickel cations. The resultant suspension is then subjected to a two-fold treatment with an aqueous solution of ammonium carbonate. Each treatment is conducted at 15° to 30° C. for 8 hours. Said treatment results in forming a nickel salt (nickel carbonate) insoluble in water. The suspension is further separated into a solid phase (precipitate) and a liquid phase. The precipitate is washed with distilled water until the nitrate ions disappear (a negative reaction with diphenylamine). The washed precipitate is granulated and then dried at 100°–120° C. for 6 hours and calcined in a current of dry air at 550°–580° C. for three hours.

The prepared catalyst has a specific surface of 250–290 $m^2/g$, an average diameter of pores of 60 A and a bulk weight of 0.650–0.680 $g/cm^3$.

Prior to the hydroisomerization process the catalyst is regenerated by treatment with hydrogen at 480° C. and under a pressure of 20 atm. for 8 to 10 hours until water stops to evolve.

For a better understanding of the present invention, examples of its specific embodiment are presented below.

Example 1

Subjected to hydroisomerization is a gasoline fraction of the coking process, boiling out within a temperature range of 35°–85° C. and having an octane number of 75.3 according to the motor method in a pure form. The composition of the fraction is as follows (wt.%): paraffin hydrocarbons, 47.8; naphthene hydrocarbons, 12.2; aromatic hydrocarbons, 5.2; olefin and diene hydrocarbons, 34.8. Hydroisomerization is carried out on a catalyst consisting of 80 weight percent of amorphous nickelalumosilicate and 20 weight percent of zeolite of the NaY type in the NiCaHY form. The catalyst has the following chemical composition (wt.%): Ni, 9; $Al_2O_3$, 6; $SiO_2$, 83; Ca, 1; H, 1. The conditions of carrying out the hydroisomerization process are as follows: a temperature of 320° C., a pressure of 40 atm., a space rate of feeding the gasoline fraction of 1.0 $hour^{-1}$, and a volumetric ratio of hydrogen to the hydrocarbon raw material of 1,000:1.

The fraction of paraffin hydrocarbons of the $C_4$–$C_7$ isostructure produced as a result of the process, has the following composition (wt.%): isobutane, 0.8; n-butane, 0.3; isopentane, 42.8; n-pentane, 2.5; 2,2-dimethylbutane, 3.0; 2,3-dimethylbutane in a mixture with 3-methylpentane, 16.2; 2-methylpentane, 9.74; n-hexane, 1.1; 2,2-dimethylpentane, 12.70; 3,3-dimethylpentane, 2.92; methylcyclopentane, 5.5; a mixture of cyclohexene with benzene, 2.44. The yield of said fraction is 98 weight percent as calculated for the initial raw material. The octane number of the fraction is 88 according to the motor method in a pure form. The catalyst operates for 2,000 hours without losing its initial activity.

Example 2

Subjected to hydroisomerization is a gasoline fraction of the coking process described in Example 1. The process is conducted on a catalyst comprising 60 wt. percent of amorphous nickelalumosilicate and 40 wt. percent of zeolite of the NaY type in the NiCaHY form. The catalyst has the following chemical composition (wt. percent): Ni, 10; $Al_2O_3$, 6; $SiO_2$, 80; Ca, 2; H, 2. The conditions of conducting the process of hydroisomerization are as follows: a temperature of 360° C., a pressure of 30 atm., a space rate of feeding the gasoline fraction of 1.5 hour$^{-1}$, and a volumetric ratio of hydrogen to the hydrocarbon raw material of 1,000:1.

The fraction of paraffin hydrocarbons of the $C_4$–$C_7$ isostructure thus obtained has the following composition (wt.%): isobutane, 1.1; n-butane, 0.6; isopentane, 42.6; n-pentane, 2.5; 2,2-dimethylbutane, 3.0; 2,3-dimethylbutane in a mixture with 3-methylpentane, 15.8; 2-methylpentane, 10.14; n-hexane, 1.0; 2,2-dimethylpentane, 12.8; 3,3-dimethylpentane, 2.52; methylcyclopentane, 5.44; a mixture of cyclohexane with benzene, 2.5. The yield of said fraction is 96.5 weight as calculated for the initial raw material. The octane number of the fraction is 89.5 according to the motor method in a pure form.

EXAMPLE 3

Subjected to hydroisomerization is a gasoline fraction of the coking process of Example 1. The process is conducted on a catalyst comprising 70 weight percent of amorphous nickelalumosilicate and 30 weight percent of zeolite of the NaY type in the NiCaHY form. The catalyst has the following chemical composition (weight percent): Ni, 7; $Al_2O_3$, 6; $SiO_2$, 84; Ca, 1.5; H, 1.5. The conditions of carrying out the hydroisomerization process are as follows: a temperature of 340° C., a pressure of 20 atm., a space rate of feeding the gasoline fraction of 1.0 hour$^{-1}$, and a volumetric ratio of hydrogen to the hydrocarbon raw material of 1,000 to 1.

The fraction of paraffin hydrocarbons of the $C_4$–$C_7$ isostructure produced as a result of the hydroisomerization process has the following composition (wt.%): isobutane, 1; n-butane, 0.5; isopentane 42.4; n-pentane, 2.3; 2,2-dimethylbutane, 3.2; 2,3-dimethylbutane in a mixture with 3-methylpentane, 16.0; 2-methylpentane, 9.94; n-hexane 1.1; 2,2-dimethylpentane, 12.82; 3,3-dimethylpentane; 2.8; methylcyclopentane - 5.41; and a mixture of cyclohexane with benzene - 2.53. The yield of said fraction is 97 weight percent as calculated for the initial raw material. The octane number of the fraction is 90 according to the motor method in a pure form.

EXAMPLE 4

Subjected to hydroisomerization is a gasoline fraction of the coking process, boiling out within the temperature range of 43°–170° C. and having an octane number of 66 according to the motor method in a pure form. The composition of the fraction (wt.%): paraffin hydrocarbons, 61.1; naphthene hydrocarbons, 6.3; aromatic hydrocarbons, 8; olefin and diene hydrocarbons, 24.6. Hydroisomerization is carried out on a catalyst comprising 90 weight percent of amorphous nickelalumosilicate and 10 weight percent of zeolite of the NaY type in the NiCaHY form. The catalyst has the following chemical composition (wt.%): Ni, 10; $Al_2O_3$, 5; $SiO_2$, 83; Ca, 1; H, 1. The conditions of carrying out the hydroisomerization process are as follows; a temperature of 400° C., a pressure of 60 atm., a space rate of feeding the gasoline fraction of 1.0 hour$^{-1}$, and a volumetric ratio of hydrogen to the hydrocarbon raw material of 1,500:1.

The fraction of paraffin hydrocarbons of the $C_4$–$C_7$ isostructure produced as a result of the hydroisomerization process has the following composition (wt.%): isobutane, 1.0; n-butane, 0.8; isopentane, 38.0; n-pentane, 4.0; 2,2-dimethylbutane, 3.4; 2,3-dimethylbutane in a mixture with 3-methylpentane, 15.9; 2-methylpentane, 9.93; n-hexane, 3.18; 2,2-dimethylpentane, 12.62; 3,3-dimethylpentane, 3.38; methylcyclopentane, 5.45; a mixture of cyclohexane with benzene, 2.43. The yield of said fraction is 52.5 weight percent as calculated for the initial raw material. The octane number of the fraction is 87 according to the motor method in a pure form.

EXAMPLE 5

Subjected to hydroisomerization is a straight run gasoline fraction boiling out within a temperature range of 160° to 195° C. and having an octane number of 50.5 according to the motor method in a pure form. The composition of the fraction is as follows (wt.%): paraffin hydrocarbons, 40.2; napthene hydrocarbons, 47; aromatic hydrocarbons, 12.1; olefin hydrocarbons, 0.7. Hydroisomerization is carried out on a catalyst comprising 60 weight percent of amorphous nickelalumosilicate and 40 weight percent of zeolite of the NaY type in the NiCaHY form. The catalyst has the following chemical composition (wt.%): Ni, 7; $Al_2O_3$, 5; $SiO_2$, 85.5; Ca, 1; H, 1.5. The conditions of carrying out the process of hydroisomerization are as follows: a temperature of 400° C., a pressure of 60 atm., a space rate of feeding the petrol fraction of 1.0 hour$^{-1}$, and a volumetric ratio of hydrogen to the hydrocarbon raw material of 1,500 to 1.

The fraction of paraffin hydrocarbons of the $C_4$–$C_7$ isostructure produced as a result of the hydroisomerization process has the following composition (wt.%): isobutane, 1.1; n-butane, 0.4; isopentane, 41.2; n-pentane, 5.7; 2,2-dimethylbutane, 1.2; 2,3-dimethylbutane, 3.8; 2-methylpentane, 15.1; 3-methylpentane, 9.45; n-hexane, 2.6; methylcyclopentane, 13.9; benzene, 1.0; cyclohexane, 1.8; 2-methylhexane, 0.8; 2,3-dimethylpentane, 0.75; 3-methylhexane, 1.1. The yield of said fraction is 62 weight percent as calculated for the initial raw material. The octane number of the fraction is 86.5 according to the motor method in a pure form.

EXAMPLE 6

Subjected to hydroisomerization is a straight run gasoline fraction boiling out within a temperature range of 85° to 160° C. and having an octane number of 63 according to the motor method in a pure form. The composition of the fraction is as follows (wt.%); paraffin hydrocarbons, 55.5; naphthene hydrocarbons, 35; aromatic hydrocarbons, 9; olefin hydrocarbons, 0.5. The hydroisomerization is carried out on a catalyst comprising 60 weight percent of amorphous nickelalumosilicate and 40 weight percent of zeolite of the NaY type in the NiCaHY form. The catalyst has the following chemical composition (weight percent): Ni, 7; $Al_2O_3$, 5; $SiO_2$, 85; Ca, 2; H, 1. The condition of conducting the hydroisomerization process are as follows: a temperature of 400° C., a pressure of 50 atm., a space rate of feeding the gasoline fraction of 1.0 hour$^{-1}$, and a volumetric ratio of hydrogen to the hydrocarbon raw material of 1,300 to 1.

The fraction of paraffin hydrocarbons of the $C_4$–$C_7$ isostructure produced as a result of the hydroisomerization process, has the following composition (wt.%): isobutane, 1.1; n-butane, 0.4; isopentane, 40.0; n-pentane, 6.9; 2,2-dimethylbutane, 1.4; 2,3-dimethylbutane, 3.8; 2-methylpentane, 14.9; 3-methylpentane, 10.45; n-hexane, 3.6; methylcyclopentane, 12.9; benzene, 1.0; cyclohexane, 0.8; 2-methylhexane, 0.9; 2,3-dimethylpentane, 0.75; 3-methylhexane, 1.1. The yield of said fraction is 38 weight percent as calculated for the initial raw material. The octane number of the fraction is 86.5 according to the motor method in a pure form.

What is claimed is:

1. A method for producing fractions of paraffin hydrocarbons having the $C_4$-$C_7$ isoparaffinic structure, said method comprising isomerizing a gasoline fraction in the presence of hydrogen with a catalyst at a temperature of 320°–400° C., under a pressure of 20 to 60 atm., and a space velocity of 1.0–1.5 hour$^{-1}$; said gasoline fraction being selected from the group consisting of a straight run gasoline fraction boiling at a temperature range of 85°–160° C., a straight run gasoline fraction boiling at a temperature of 160°–195° C., a gasoline fraction formed by a coking reaction, boiling at a temperature of 43°–170° C.; said catalyst comprising amorphous nickelaluminosilicate and a zeolite of the NaY type in the NiCaHY form in a weight ratio of 60–90: 40–10, respectively, and said catalyst comprising 7 to 10% of Ni, 5 to 6% of $Al_2O_3$, 80 to 86% $SiO_2$, 1 to 2% of Ca and 1 to 2% of hydrogen, all of said percentages being by weight of said catalyst.

* * * * *